United States Patent Office 2,868,816
Patented Jan. 13, 1959

2,868,816

PROCESS FOR THE PREPARATION OF CYCLOPENTADIENYL MANGANESE TRICARBONYL COMPOUNDS

Harris E. Petree, Baton Rouge, La., assignor to Ethyl Corporation, New York, N. Y., a corporation of Delaware No Drawing. Application November 8, 1956
Serial No. 621,000

8 Claims. (Cl. 260—429)

This invention relates to organometallic compounds and more particularly to an improved process for the preparation of cyclopentadienyl manganese tricarbonyl coordination compounds.

Cyclopentadienyl manganese tricarbonyl compounds are prepared by the reaction between dicyclopentadienyl manganese and carbon monoxide. This process, however, suffers the great disadvantage that the maximum theoretical utilization of the cyclopentadiene used to prepare the dicyclopentadienyl manganese is 50 percent. This is due primarily to the fact that the dicyclopentadienyl manganese reacts with the carbon monoxide to form a cyclopentadienyl radical and a cyclopentadienyl manganese tricarbonyl compound. The cyclopentadiene radical produced by this reaction polymerizes with other like radicals and is not susceptible to recovery and recycle in the process.

It is apparent, therefore, that a process which inhibits the polymerization of the cyclopentadienyl radicals in the above described reaction and which would permit recovery of the cyclopentadiene compound in a useable form would be of great benefit in the production of cyclopentadienyl manganese tricarbonyl compounds.

It is, therefore, an object of this invention to provide a process for the production of cyclopentadienyl manganese tricarbonyl type compounds. Another object of this invention is to provide a process for the preparation of cyclopentadienyl manganese tricarbonyl compounds in which the cyclopentadiene compound released in the reaction between dicyclopentadienyl manganese compounds and carbon monoxide is recovered for subsequent use. Another object of the present invention is to provide an improved process for the preparation of methylcyclopentadienyl manganese tricarbonyl.

It has now been discovered that the above and other objects of this invention are accomplished by reacting a dicyclopentadienyl manganese compound with carbon monoxide in the presence of hydrogen. It is then possible to recover not only a good yield of the cyclopentadienyl manganese tricarbonyl compound, but it is also possible to recover, in good yield, the cyclopentadiene compound in a form in which it is available for recycle. That is, the cyclopentadienyl compound is recovered as a monomeric or dimeric compound, and it is not lost as a polymeric tar as is the case when no hydrogen is present in the reaction mixture.

A preferred embodiment of the instant invention comprises reacting di(methylcyclopentadienyl) manganese with carbon monoxide in the presence of hydrogen and recovering from the reaction mixture a good yield of both methylcyclopentadienyl manganese tricarbonyl and methylcyclopentadiene dimer.

The di(cyclopentadienyl) manganese compound, which is reacted with carbon monoxide in the process of this invention, is conveniently prepared from an alkali metal cyclopentadienyl compound and a manganese salt. Examples of these manganese salts are manganous acetate, manganous benzoate, manganous carbonate, manganous oxalate, manganous lactate, manganous nitrate, manganous phosphate, manganic phosphate, manganous sulfate, manganous fluoride, manganous chloride, manganous bromide, and manganous iodide and the like. In addition manganese salts of β-diketones, such as tris (2,4-pentanedione) manganese and tris(2,4-hexanedione) manganese may also be employed, as well as manganese salts of β-keto esters, such as the manganese salts of ethylacetoacetate, and the like. An example of this is the reaction of cyclopentadienyl sodium with manganous halide to give bis(cyclopentadienyl) manganese. Cyclopentadienyl alkali metal compounds are also reacted with naturally occurring manganese ores, such as manganosite (MnO), manganese dioxide ($MnO_2$), manganic sesquioxide ($Mn_2O_3$), manganous sulfide (MnS), manganic sulfide ($MnS_2$), rhodochrosite ($MnCO_3$), and the like, to give di(cyclopentadiene) manganese compounds such as di(methylcyclopentadienyl) manganese.

The manganese compound can be separated from the reaction mixture by distillation or other conventional methods and subsequently reacted with carbon monoxide, either with or without a solvent, or, the reaction mixture containing the di(cyclopentadienyl) manganese compound is subjected to reaction with carbon monoxide in the presence of hydrogen to give a reaction product containing the cyclopentadienyl manganese tricarbonyl compound such as, for example, cyclopentadienyl manganese tricarbonyl.

The cyclopentadienyl alkali metal compound used in the preparation of the di(cyclopentadienyl) manganese compounds is synthesized by reaction of a cyclopentadiene compound with an alkali metal or alkali metal amide. To this alkali metal compound, which is preferably contained in a suitable solvent such as tetrahydrofuran, is added the manganous salt and the resulting di(cyclopentadienyl) manganese compound is reacted with carbon monoxide in the presence of hydrogen either in the reaction mixture or else in the pure state after separation.

Another method of preparing a cyclopentadienyl manganese tricarbonyl compound comprises introducing a cyclopentadiene compound into a mixture of manganous salt and alkali metal and reacting the mixture thus obtained with carbon monoxide to produce the cyclopentadienyl manganese tricarbonyl compound. The product and remaining cyclopentadiene compound can be separated from the reaction mixture by solution in a solvent, such as an ether, and the removal of the solid impurities by filtration, centrifugation, and the like. Product can also be separated from the reaction mixture by steam distillation or selective solvent extraction. The solvent and cyclopentadiene compound may be removed from the product by fractional distillation and the product further purified by fractional distillation or sublimation. The process of this invention is further illustrated in the following examples. Example I illustrates a process not utilizing this invention and is included for purposes of comparison.

*Example I*

To 230 parts of a 50 percent mineral oil dispersion of sodium and 1776 parts of tetrahydrofuran, was added 423 parts of methylcyclopentadiene which was freshly prepared by thermally cracking methylcyclopentadiene dimer.

An aliquot of this material representing 96.4 parts of methylcyclopentadienyl sodium was added to 60 parts of manganous chloride. The temperature rose from 19 to 29° during the addition. The mixture was stirred and refluxed for two hours, cooled and charged to a pressure resistant reaction vessel which had been flushed with purified nitrogen. The vessel was equipped with gas inlet and outlet means, temperature and pressure devices, heating and cooling means and means for agitation. The vessel was pressured to 2000 p. s. i. with carbon monoxide at room temperature, sealed and heated to 160° over a 50 minute period. Carbon monoxide was added to increase the pressure to 3100 p. s. i. and the mixture was maintained at 160° for one hour of constant agitation. After cooling and venting, the reaction vessel was opened and the contents discharged, steamed distilled and fractionated at a reduced pressure of 13 millimeters to yield 73.1 parts of methylcyclopentadienyl manganese tricarbonyl boiling at 110° and 6.5 parts of methylcyclopentadiene dimer boiling from 75 to 80° C. at this reduced pressure. The amount of methylcyclopentadiene dimer recovered represents 8.1 percent of the total amount used.

The above example illustrates a process for the preparation of cyclopentadienyl manganese tricarbonyl compounds by the reaction of a dicyclopentadienyl manganese compound and carbon monoxide in the absence of hydrogen. Whereas an acceptable yield of the cyclopentadienyl manganese tricarbonyl compound is produced, approximately 65 percent of the cyclopentadiene compound is not associated with the desired compound and, as shown, only a small portion of this unused amount can be recovered from the reaction mixture.

*Example II*

The process of Example I was repeated except that the pressure resistant vessel was pressured at room temperature to 1425 p. s. i. with hydrogen after which the pressure was increased to 2100 p. s. i. by the addition of carbon monoxide. The vessel was then sealed, heated and the pressure adjusted with carbon monoxide and the reaction conducted as outlined in Example I. Steam distillation and fractionation of the product produced 80.2 parts of methylcyclopentadienyl manganese tricarbonyl and 30.7 parts of methylcyclopentadiene dimer. Thus, a 77 percent conversion to methylcyclopentadienyl manganese tricarbonyl based on manganous chloride was achieved and 38.4 percent of the methylcyclopentadiene used was recovered as the dimer.

It is thus apparent that when the reaction between a dicyclopentadienyl manganese compound and carbon monoxide is conducted in the presence of hydrogen not only is the yield of cyclopentadienyl manganese tricarbonyl compound increased, but a vast improvement is obtained in the amount of cyclopentadiene compound which can be recovered from the reaction mixture. In Example I where only 8.1 percent of the cyclopentadiene compound was recovered, no hydrogen was present in the reaction mixture while in Example II, in which hydrogen was used, 38.4 percent of the cyclopentadiene compound was recovered. This represents approximately 475 percent improvement in the recovery of the cyclopentadiene compound.

Equally outstanding results are obtained when the process outlined in Example II is applied to the preparation of amyl indenyl manganese tricarbonyl, diethylcyclopentadienyl manganese tricarbonyl, butylcyclopentadienyl manganese tricarbonyl and the like.

*Example III*

The procedure of Example II is followed by reacting a toluene solution of dicyclopentadienyl manganese prepared from cyclopentadienyl sodium and manganese dibromide with carbon monoxide in the presence of hydrogen for two hours at 200° C. The total pressure at the maximum temperature is 10,000 p. s. i. g. and the hydrogen to carbon monoxide pressure ratio before heating is 100 to one. A good yield of cyclopentadienyl manganese tricarbonyl is separated from the reaction mixture and a high recovery of cyclopentadiene dimer is distilled from the reaction mixture.

*Example IV*

The procedure of Example III is followed by reacting diindenyl manganese with carbon monoxide using dibutyl ether of diethylene glycol as a solvent. The reaction is conducted at a total pressure of 300 p. s. i. g. using a carbon monoxide to hydrogen pressure ratio of about 2:1. Indenyl manganese tricarbonyl is isolated in good yield from the reaction mixture and a high percentage of indene is separated from the reaction mixture along with the solvent.

*Example V*

Di(ethylcyclopentadienyl) manganese in the diethyl ether of ethylene glycol as a solvent is reacted with carbon monoxide in the presence of hydrogen at a temperature of 200° C. for one hour and 30 minutes following a 40 minute preheat period. The maximum pressure attained is 2,000 p. s. i. of which approximately 1,800 p. s. i. is due to the presence of hydrogen. A good yield of ethylcyclopentadienyl manganese tricarbonyl and the dimer of ethylcyclopentadiene are recovered from the reaction mixture.

*Example VI*

Example III is repeated using a carbon monoxide to hydrogen pressure ratio of 100:1 at a total pressure of 50,000 p. s. i. and a temperature of 350° C. A good yield of cyclopentadienyl manganese tricarbonyl results. A good recovery of cyclopentadiene is also obtained.

*Example VII*

Example II is repeated conducting the reaction with carbon monoxide at 65° C. A good yield and recovery of methylcyclopentadienyl manganese tricarbonyl and methylcyclopentadiene dimer results.

The temperatures of the steps in this process may be varied. For example, the reaction of sodium with the cyclomatic compound can be performed at temperatures up to the boiling point of the cyclopentadienyl compound. For dicyclopentadiene, this is about 175° C. at which point cracking to the monomer occurs and the latter reacts with sodium to form cyclopentadienyl sodium. A preferred range of temperatures is from about 10° C. to about 65° C. when conducting the reaction in a solvent, such as tetrahydrofuran. The upper temperature represents the boiling point of tetrahydrofuran. The manganese salt, i. e., $MnCl_2$, $MnBr_2$, or $MnSO_4$, etc., may be added to the alkali metal cyclomatic compound at temperatures ranging from —20 to 65° C. and higher, depending on the boiling point of the solvent, and since there is no great temperature rise upon addition of the manganese halide, the temperature limits are not critical. However, it is preferred to conduct this reaction at a temperature of from 20–65° C. in order to cut down the time of reaction. The reaction mixture need not be refluxed; however, reflux periods up to 16 hours have been employed with good success.

The temperature at which CO reacts with the intermediate bis(cyclopentadienyl) manganese compound varies from 0° C. to about 350° C. with the rate of reaction increasing as the temperature is increased. The temperature of the reaction depends on the freezing point of the intermediate di(cyclopentadienyl) manganese compound or the freezing point of the solvent employed, if any, and also upon the partial pressure of the carbon monoxide. An especially preferred range of temperatures for the carbonylation of the cyclopentadienyl manganese intermediate is from 65 to about 200° C., as temperatures within this range are easily maintainable and good yields are realized.

Carbon monoxide reacts with the cyclopentadienyl manganese compound to form the cyclopentadienyl manganese tricarbonyl compounds at partial pressures below atmospheric to as high as 50,000 p. s. i. and higher. However, a preferred range of carbon monoxide pressures at which the reaction is conducted is from about 10 to about 10,000 p. s. i. g., as no great advantage is gained by going to higher CO pressures, and at pressures below about 10 p. s. i. g the time required to obtain a given amount of product is considerably lengthened. An especially preferred range of carbon monoxide pressures for the carbonylation of cyclomatic manganese compounds according to this invention is from 20 to about 3000 p. s. i., as it is found that this reaction proceeds quite readily and can be conducted in moderate-pressure apparatus.

The hydrogen partial pressures utilized in the process of this invention vary over a wide range. As a general rule, the higher the hydrogen pressure the more cyclopentadiene compound will be recovered from the reaction to become available for recycle. Thus, hydrogen pressures from about one atmosphere to as high as 50,000 atmospheres are employed. However, partial pressures of hydrogen of from about 20 to about 3000 p. s. i. are preferred for the reasons given above.

In the process of this invention, the ratio of carbon monoxide pressure to hydrogen pressure varies from about 100 to 1 to about 1 to 100. As the amount of cyclopentadiene compound recovered depends upon the hydrogen pressure a high proportion of hydrogen favors recovery of the cyclopentadiene compound. On the other hand a high partial pressure of carbon monoxide favors a high yield of cyclopentadienyl manganese tricarbonyl compound and shorter reaction times. The exact proportions chosen depend on a balancing of these factors against the economics of the relative cost of the materials and processing equipment. Ratios of carbon monoxide to hydrogen pressure of from 2 to 1 to about 1 to 10 are found to give both a good yield of cyclopentadienyl manganese tricarbonyl compound and a good recovery of cyclopentadiene compound.

The time of reaction of the carbonylation processes depends on temperature and carbon monoxide pressure conditions, etc., and will vary over a wide range. Thus, at high pressures of carbon monoxide and temperatures the reaction goes to completion in a matter of a few minutes, while at lower pressures and temperatures it is advantageous to keep the CO in contact and in agitation with the cyclopentadienyl manganese compound for a period of 1-10 hours.

Solvents or mixtures thereof, which are employed in the practice of this invention, are n-butyl ether, dioxane, toluene, and dimethyl ether of ethylene glycol. Also, as indicated above, solvents are not essential for the conduction of the reaction of carbon monoxide with the cyclomatic manganese compounds to produce the cyclopentadienyl manganese tricarbonyl compounds.

The alkali metals used to make the metal derivatives of the cyclopentadienyl compounds which are then reacted with a manganese compound to make the cyclopentadienyl manganese compound include lithium, sodium, potassium, rubidium and cesium. Metals other than the alkali metals that can be used are the group IIA metals such as beryllium, magnesium, calcium, strontium, and barium, and group IIB metals such as zinc and cadmium. In the case of polyvalent metals, the compounds may contain halogen such as the Grignard reagent in the case of magnesium.

The product recovery procedure employed depends on the method of preparation and on the compound synthesized. When reacting CO with pure di(cyclopentadienyl) manganese, the product may be separated and purified by fractional distillation or sublimation at reduced pressures as illustrated hereinabove. Another method of separation is to steam distill the reaction mixture, separate the organic product layer from the aqueous layer and further purify the product by fractional distillation at reduced pressures. This latter method is employed with good success when the carbon monoxide is reacted with the intermediate from its reaction mixture. Another method of separation involves extraction of the cyclopentadienyl manganese tricarbonyl compound from the reaction mixture with selective solvents such as benzene, ether, etc., and the separation of the product from the solvent by fractional distillation followed by further purification consisting of either fractional distillation, sublimation or both.

The remaining and recovered cyclopentadienyl compound is conveniently separated from the reaction mixture by distillation. This is accomplished at reduced pressure when necessary to effect separation from the solvent or cyclopentadienyl manganese tricarbonyl compound. In certain embodiments of this invention it is not necessary to effect a separation between the solvent and recovered cyclopentadiene compound. In this case the solvent and recovered cyclopentadiene compound are removed together from the reaction mixture and recycled to the appropriate reaction step.

In the above examples the cyclopentadienyl alkali metal compound was prepared by reaction of the cyclopentadiene compound with a dispersion of the alkali metal in mineral oil. A number of other methods for the preparation of these compounds may be employed however. For example, sodium cyclopentadiene has been prepared by the reaction of cyclopentadiene with sodamide.

In the above examples nitrogen was employed as the inert atmosphere to prevent oxygen from coming in contact with the reactants. Other inert gases may also be used, e. g., argon, methane, ethane, propane, and other hydrocarbons and vapors of the solvents employed in the reaction.

The process of this invention is susceptible to continuous operations. This is accomplished in a variety of ways. For example, the di(cyclopentadienyl) manganese compound in a suitable solvent is passed through a reaction zone while a positive pressure of hydrogen and carbon monoxide is maintained and a continuous stream of products is removed from the reaction zone. This product stream is rectified to yield a cyclopentadienyl manganese tricarbonyl compound and a solution of cyclopentadiene compound. The cyclopentadiene compound is recycled to a preliminary reactor where it is added to additional cyclopentadiene compound, heated and treated with sodium in a suitable form to prepare a cyclopentadienyl sodium compound. This latter compound is reacted with manganous chloride and the resulting intermediate is then passed through the hydrogen-carbon monoxide zone for the start of a new cycle.

The process of this invention is applicable to the preparation of cyclopentadienyl manganese tricarbonyl compounds irrespective of the size of the cyclopentadienyl radical. However, a preferred class of compounds prepared by this process comprises those compounds in which the cyclopentadienyl radical has up to 13 carbon atoms. These are preferred since the resulting compounds are excellent antiknock agents. Examples of such preferred cyclopentadienyl radicals include: cyclopentadienyl, methylcyclopentadienyl, ethylcyclopentadienyl, indenyl, ethylmethylindenyl, aryl indenyl, dipropylcyclopentadienyl, actylcyclopentadienyl manganese tricarbonyl and the like.

Compounds prepared by the process of this invention can be used as hydrocarbon fuel additives. When added to hydrocarbon fuels, they act as antiknock agents enhancing the octane quality both of clear fuels and fuels containing other additives including other antiknock additives such as, for example, tetraethyllead. When our additives are employed in fuels as, for example, in hydrocarbon fuels of the gasoline boiling range, the amount employed per gallon of fuel varies depending on the enhancement in antiknock quality desired.

The antiknock enhancement provided by the compounds prepared by the process of this invention is illustrated by the following results. When manganese in the form of methylcyclopentadienyl manganese tricarbonyl is added to a commercial fuel having an initial boiling point (IBP) of 94° F. and a final boiling point (FBP) of 390° F. in concentrations equivalent to one gram of manganese per gallon of fuel, the antiknock quality of the fuel, as determined by rating in a standard C. F. R. single-cylinder knock test engine according to ASTM test procedure D–908–51, is increased from 83.1 to 92.3 octane number units. To obtain the same increase with tetraethyllead in antiknock quality would require 3.22 grams of lead per gallon. Thus, manganese in this form is 322 percent as effective as lead in the form of tetraethyllead in increasing the octane value of hydrocarbon fuels.

When one gram of manganese in the form of cyclopentadienyl manganese tricarbonyl is added per gallon of a commercial fuel having an IBP of 112° C. and an FBP of 318° C. and containing 3.13 grams of lead per gallon in the form of tetraethyllead, the increase in antiknock value is from 98.5 to 114.0 octane number units, or an increase of 15.5 octane numbers. To obtain this increase with lead would require an additional 7 grams of lead per gallon as tetraethyllead.

I claim:

1. A process which comprises reacting a dicyclopentadienyl manganese hydrocarbon compound with carbon monoxide in the presence of hydrogen with the ratio of the partial pressure of carbon monoxide to hydrogen varying from about 100:1 to about 1:100.

2. The process of claim 1 wherein the ratio of the partial pressure of carbon monoxide to hydrogen is from about 2:1 to about 1:10.

3. A process for the preparation of a cyclopentadienyl manganese tricarbonyl compound which comprises reacting a dicyclopentadienyl manganese hydrocarbon compound with carbon monoxide in the presence of hydrogen with the ratio of the partial pressure of carbon monoxide to hydrogen varying from about 100:1 to about 1:100 and recovering said cyclopentadienyl manganese tricarbonyl compound from the reaction mixture.

4. The process of claim 3 wherein the ratio of the partial pressure of carbon monoxide to the partial pressure of hydrogen varies from about 2:1 to about 1:10.

5. A process which comprises reacting a dicyclopentadienyl manganese hydrocarbon compound with carbon monoxide in the presence of hydrogen with the ratio of the partial pressure of carbon monoxide to the partial pressure of hydrogen varying from about 100:1 to about 1:100, recovering a cyclopentadienyl manganese tricarbonyl compound from the reaction mixture and recovering a cyclopentadiene compound from said mixture.

6. The process of claim 5 wherein the ratio of the partial pressure of carbon monoxide with respect to the partial pressure of hydrogen varies from about 2:1 to about 1:10.

7. A process for the preparation of methylcyclopentadienyl manganese tricarbonyl which comprises reacting di(methylcyclopentadienyl) manganese with carbon monoxide in the presence of hydrogen with the ratio of the partial pressure of carbon monoxide with respect to the partial pressure of hydrogen varying from about 100:1 to about 1:100, recovering methylcyclopentadienyl manganese tricarbonyl from the reaction mixture and recovering methylcyclopentadiene dimer from said mixture.

8. The process of claim 7 wherein the ratio of the partial pressure of carbon monoxide with respect to the partial pressure of hydrogen varies from about 2:1 to about 1:10.

References Cited in the file of this patent

Fischer et al.: "Zeit. Naturforsch.," 9b, pp. 618–619 (1954).

Gilman: "Organic Chemistry," 2nd ed., vol. 1, Wiley & Sons, Inc., New York (1943); page 599 relied on.